US008553639B2

(12) United States Patent
Acharya et al.

(10) Patent No.: US 8,553,639 B2
(45) Date of Patent: Oct. 8, 2013

(54) ALLOCATION OF SUBFRAMES FOR UPLINK AND DOWNLINK TRANSMISSION IN TDD-LTE

(75) Inventors: Joydeep Acharya, Sunnyvale, CA (US);
Long Gao, Santa Clara, CA (US);
Sudhanshu Gaur, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 64 days.

(21) Appl. No.: 13/368,264

(22) Filed: Feb. 7, 2012

(65) Prior Publication Data
US 2013/0201864 A1 Aug. 8, 2013

(51) Int. Cl.
| H04W 4/00 | (2009.01) |
| H04L 12/26 | (2006.01) |
| H04W 72/00 | (2009.01) |
| G06F 15/173 | (2006.01) |

(52) U.S. Cl.
USPC ............ 370/329; 370/252; 455/450; 709/226

(58) Field of Classification Search
None
See application file for complete search history.

(56) References Cited

U.S. PATENT DOCUMENTS

| 6,334,057 | B1 | 12/2001 | Malmgren et al. |
| 6,993,341 | B2 | 1/2006 | Hunzinger |
| 7,535,867 | B1 | 5/2009 | Kilfoyle et al. |
| 8,254,295 | B2 * | 8/2012 | Choi et al. ..................... 370/280 |
| 2002/0099854 | A1 | 7/2002 | Jorgensen |
| 2009/0046605 | A1 | 2/2009 | Gao et al. |
| 2009/0059860 | A1 | 3/2009 | Maltsev et al. |
| 2009/0135748 | A1 | 5/2009 | Lindoff et al. |
| 2009/0181689 | A1 | 7/2009 | Lee et al. |
| 2010/0027446 | A1 | 2/2010 | Choi et al. |
| 2010/0202373 | A1 * | 8/2010 | Chun et al. ..................... 370/329 |
| 2010/0323749 | A1 | 12/2010 | Lee et al. |
| 2011/0013543 | A1 * | 1/2011 | Lim et al. ..................... 370/281 |
| 2011/0038341 | A1 | 2/2011 | Norlund et al. |
| 2011/0134778 | A1 * | 6/2011 | Lim et al. ..................... 370/252 |
| 2012/0039280 | A1 * | 2/2012 | Chen et al. ..................... 370/329 |
| 2013/0083736 | A1 * | 4/2013 | Yin et al. ..................... 370/329 |

FOREIGN PATENT DOCUMENTS

WO 2010105398 A1 9/2010

OTHER PUBLICATIONS

J. Acharya et al., Separate Associations of a Mobile to Different Base Stations in Uplink and Downlink, corresponding to U.S. Appl. No. 13/253,907, filed Oct. 5, 2011.
3GPP TS 36.211, Physical Channels and Modulation, Release 8, Mar. 2009.
3GPP TR 36.819, Coordinated Multi-point operation for LTE, Physical Layer Aspects, Release 11, Jun. 2011.

(Continued)

*Primary Examiner* — Clemence Han
(74) *Attorney, Agent, or Firm* — Procopio, Cory, Hargreaves & Savitch LLP

(57) ABSTRACT

Systems and methods are directed to deciding the number of subframes in a frame to use for uplink transmission, with the remaining frames used for downlink transmission for a Base Station (BS) in a Time Division Duplexing Long Term Evolution (TDD-LTE). Systems and methods are based on the number of User Equipment (UEs) that the BS has to serve in the uplink and in the downlink, as well as the uplink (UL) and downlink (DL) traffic loads per user. Systems and methods are directed to allowing a TDD LTE BS to partition the subframes in a frame for its UL and DL traffic.

18 Claims, 12 Drawing Sheets

Algorithm showing the proposed UL subframe allocation ratio

(56) References Cited

OTHER PUBLICATIONS

F. Meshkati et al., Mobility and Femtocell Discovery in 3G UMTS Networks, Feb. 2010, http://www.qualcomm.com/documents/files/mobility-and-femtocell-discovery-in-3g-umts-networks.pdf.

ITU-R M.2135, Guidelines for evaluation of radio interface technologies for IMT-Advanced, 2008.

Y. Tokgoz, et al., Uplink Interference Management for HSPA+ and 1xEVDO Femtocells, in proceedings of IEEE Globecom 2009.

E. Dahlman et al., 4G LTE/LTE-Advanced for Mobile Broadband, Academic Press, 2011, pp. 301-303.

3GPP TR 36.814 V9.0.0, Technical Specification Group Radio Access Network; Evolved Universal Terrestrial Radio Access (E-UTRA); Further advancements for E-UTRA physical layer aspects, Release 9, Mar. 2010.

* cited by examiner

Fig 6: Algorithm showing the proposed UL subframe allocation ratio

| Pico | UL | UL | UL | UL | UL | UL | DL | DL | DL | DL |

Fig. 9(a)

| Macro | UL | UL | UL | UL | DL | DL | DL | DL | DL | DL |

Fig. 9(b)

ALLOCATION OF SUBFRAMES FOR UPLINK AND DOWNLINK TRANSMISSION IN TDD-LTE

BACKGROUND OF THE INVENTION

Related art wireless systems may involve user equipment (UE) such as a mobile phone, laptop or PDA that interact with a centralized entity such as a Base Station (BS). BS's may be cellular base stations or wireless local area network (WLAN) Access points (AP). FIG. 1 illustrates an exemplary configuration of a base station with downlink and uplink transmissions. Transmission 101 from the BS 100 to the UE 103 is known as a downlink (DL) transmission, and transmission 104 from the UE 105 to the BS 100 is known as an uplink (UL) transmissions. From the point of view of the UE, data is received from the BS via a DL channel 102, and data is transmitted to the BS via a UL channel 106.

The link gain (loss) Loss of a wireless channel depends on several factors and can be expressed as:

$$\text{Loss} = PL + S + F + G_{Ant} + L_{Misc} \quad (1)$$

where PL is the path loss, S is the large scale shadow fading, F is the small scale multipath fading, $G_{Ant}$ is the antenna gain factor and $L_{Misc}$ are other the miscellaneous gain factors. The path loss and fading parameters are dependent on the frequency of the signal being transmitted.

The first action of a UE when the UE is switched on is to associate with a BS. The UE measures signals generated by the BS. These signals may be synchronization symbols for cellular systems and AP beacons in WLAN systems, and are known as Reference Signals (RS). Each BS transmits RS's in the DL channel periodically. The received signal strength at the UE is called the RS received power (RSRP) and is expressed in terms of the transmit power P, of the BS, as:

$$RSRP_i = Loss_i + P_i \quad (2)$$

The UE measures $RSRP_i$ of each $BS_i$ and may associate with the BS with the maximum value. UE association is based on the DL channel RSRP, which depends on the DL channel link gain. However, the UE subsequently sends to the same BS for both UL and DL transmissions. If the UL channel from the UE to the BS is the strongest channel amongst the set of available UL channels to different BSs, then the same BS may be utilized for both UL and DL transmissions.

However, DL-UL imbalance in link gains is not an uncommon problem. In Third Generation Partnership Project (3GPP) Universal Mobile Telecommunication Systems (UMTS), a UE in a soft handoff situation may handle a DL-UL imbalance to a certain extent. The serving cell may have the stronger DL, but the UL to the non-serving cell may be stronger than the UL to the serving cell. Both 3GPP Release 99 (R99) and High Speed Uplink Packet Access (HSUPA) sessions may exploit the inherent diversity from soft handoff to operate in the presence of some DL-UL imbalance. However, with High Speed Downlink Packet Access (HSDPA) and Long Term Evolution (LTE), the UL to the serving cell affects feedback control information. HSDPA and LTE throughput may be severely impacted as a result of a DL-UL imbalance. One way to mitigate the impact is to change serving cells based not just on DL quality but UL quality as well. However, the problem is more serious in heterogeneous 3GPP networks settings, where different BS;s can have different transmit powers.

SUMMARY

Aspects of the exemplary embodiments include a base station, which involves an information processing module that determines a number of uplink user equipments (UE's) handled by the base station and a number of downlink UEs handled by the base station; a calculation module that determines a metric calculation based on the number of uplink UEs and the number of downlink UEs; and a frame formatting module that adjusts a number of subframes within a frame based on the metric determination.

Additional aspects of the exemplary embodiments include a method of operating a base station, which includes determining a number of uplink user equipments (UEs) handled by the base station and a number of downlink UEs handled by the base station; determining a metric calculation based on the number of uplink UEs and the number of downlink UEs; and adjusting a number of subframes within a frame based on the metric determination.

Additional aspects of the exemplary embodiments include a non-transitory computer readable medium, having stored therein a program for making a computer execute a method for operating a base station, the program including computer executable instructions for performing steps, which includes determining a number of uplink user equipments (UEs) handled by the base station and a number of downlink UEs handled by the base station; determining a metric calculation based on the number of uplink UEs and the number of downlink UEs; and adjusting a number of subframes within a frame based on the metric determination.

BRIEF DESCRIPTION OF THE DRAWINGS

These, and or/other aspects will become more readily appreciated from the following description of the embodiments, taken in conjunction with the accompanying drawings, in which:

FIGS. 9(a) and 9(b) illustrate an example division of subframes for the macro and pico that results from subframe adjustments.

DETAILED DESCRIPTION

To handle the link asymmetry problem, exemplary embodiments are directed to separate association of a UE to two different BS's—one for handling its UL transmission, and one for handling its DL transmission. The UL may receive DL data from the BS, but transmit in the UL to the picocell base station (pico), to address the UL and DL interference problems.

Wireless systems work in half duplex mode, where the transmission resources are divided between uplink and downlink transmissions to achieve orthogonality. In LTE, there are two kinds of duplexing done: Frequency Division Duplex (FDD) where the transmission bandwidth is divided for uplink and downlink transmissions and Time Division Duplex (TDD), where the division is done in time domain. More specifically, some of the subframes in a frame are assigned for DL transmission and the others for UL transmission for TDD. Both subframes cover the entire transmission bandwidth.

If a UE can associate with two different BS in uplink and downlink, then any given BS can serve a different number of UEs in uplink and downlink, which is taken into account when the transmission resources are split in half duplex LTE systems.

Figure 1:
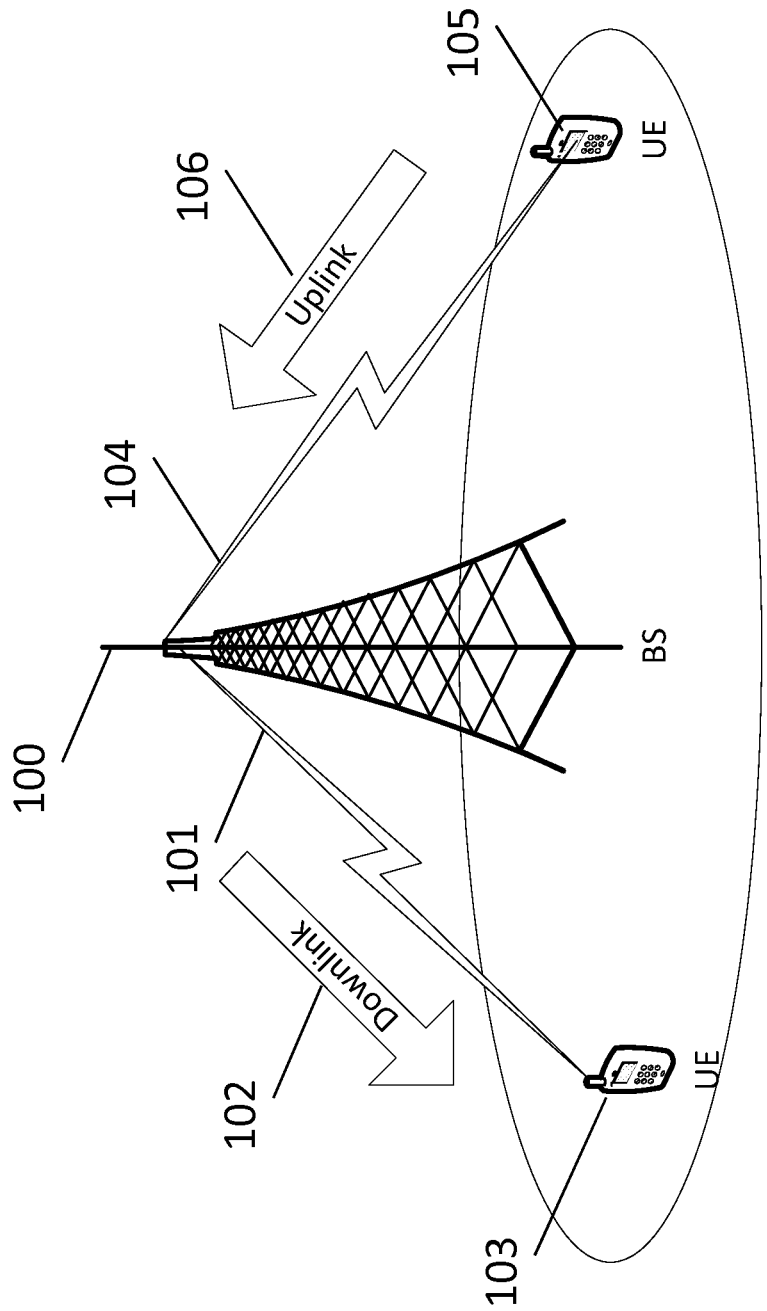
FIG. 1 illustrates an exemplary configuration of a base station with downlink and uplink transmissions.
Figure 2A:
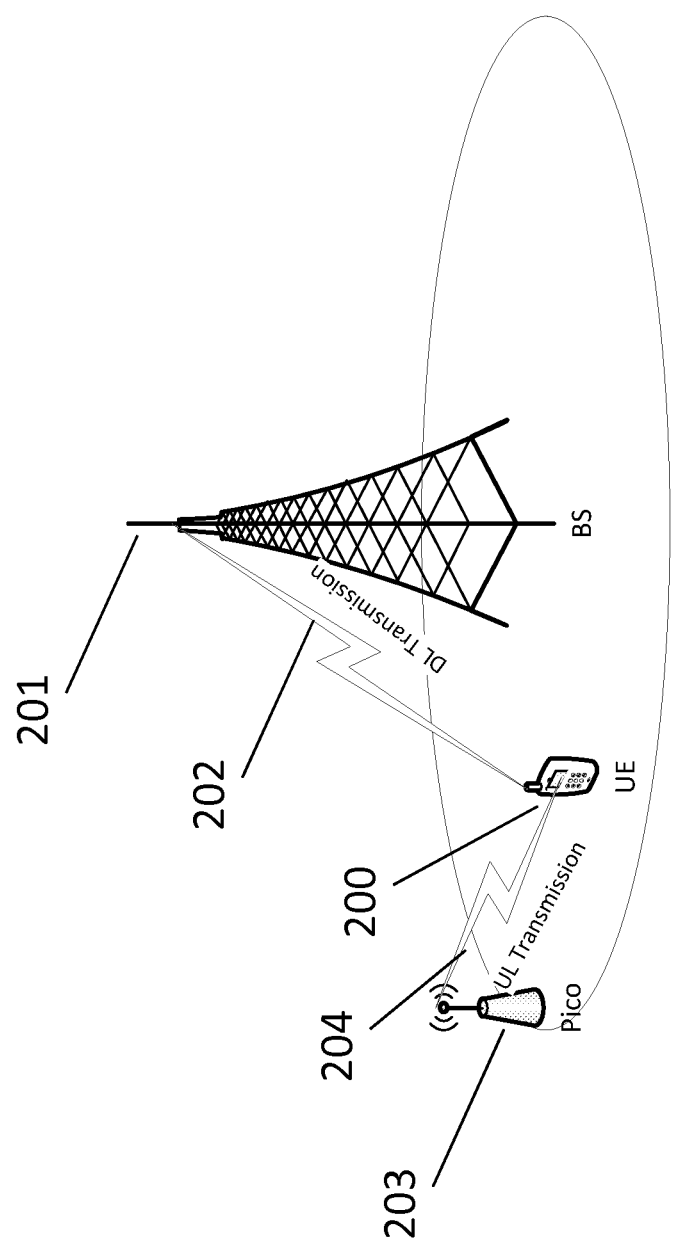
FIGS. 2(a) to 2(c) illustrate a UE receiving data from a BS in DL and transmitting data to a pico cell base station (pico) in the UL, and system configurations of the BS and pico in accordance with an exemplary embodiment.

FIG. 2(a) illustrates a UE 200 receiving data from a BS 201 in DL 202 and transmitting data to a Pico 203 in the UL 204, in accordance with an exemplary embodiment. The same UE 200 is associated with the macro 201 for DL transmission and the pico 203 for UL transmission. To handle such asymmetric transmission, system configurations for the macro 201 and 203, are utilized, as shown in FIGS. 2(b) and 2(c).

Figure 2B:
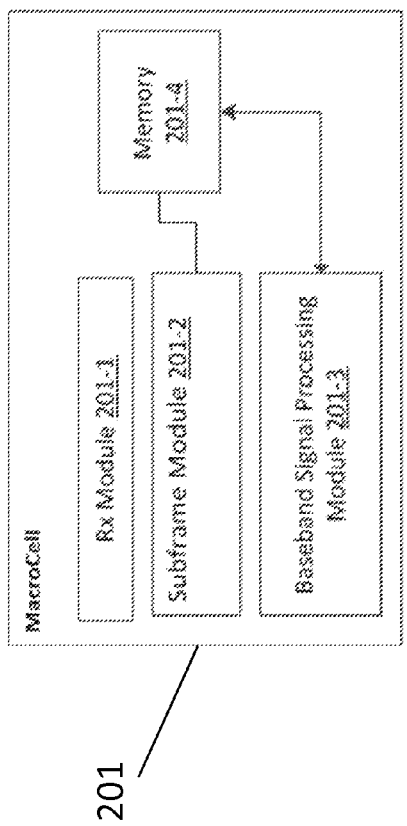
Figure 2C:
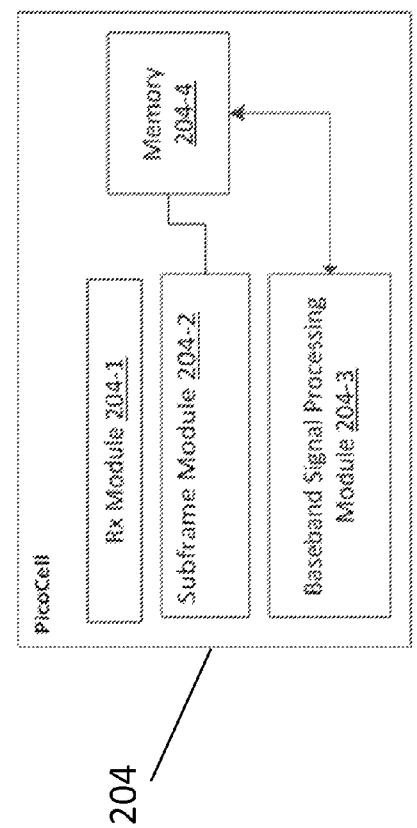

In FIG. 2(b), the macro cell base station (macro) 201 utilizes an Rx Module 201-1, a Subframe Module 201-2, a Baseband Signal Processing Module 201-3 and a Memory 201-4. In FIG. 2(c), the Pico 204 utilizes an Rx Module 204-1, a Subframe Module 204-2, a Baseband Signal Processing Module 204-3, and a Memory 204-4. The subframe modules 201-2 and 204-2 may partition the available resources (subframes for TDD) into UEs, taking into account the fact that the UL and DL traffic characteristics are different due to different number of UEs associated. The subframe modules are further described in FIG. 7.

More resources may be assigned to the BS in proportion to the UEs served in the downlink by the BS. For FDD, the hardware constraints may limit sharing of bandwidth between UL and DL transmissions. For example, if the 758-768 Megahertz (MHz) range is set aside for DL transmission and the corresponding UL transmission occurs at the 788-798 MHz range, then it may be difficult to take bandwidth from the DL range and assign the bandwidth to UL and vice versa. In the TDD mode, hardware constraints may present less of a limitation.

Figure 3:
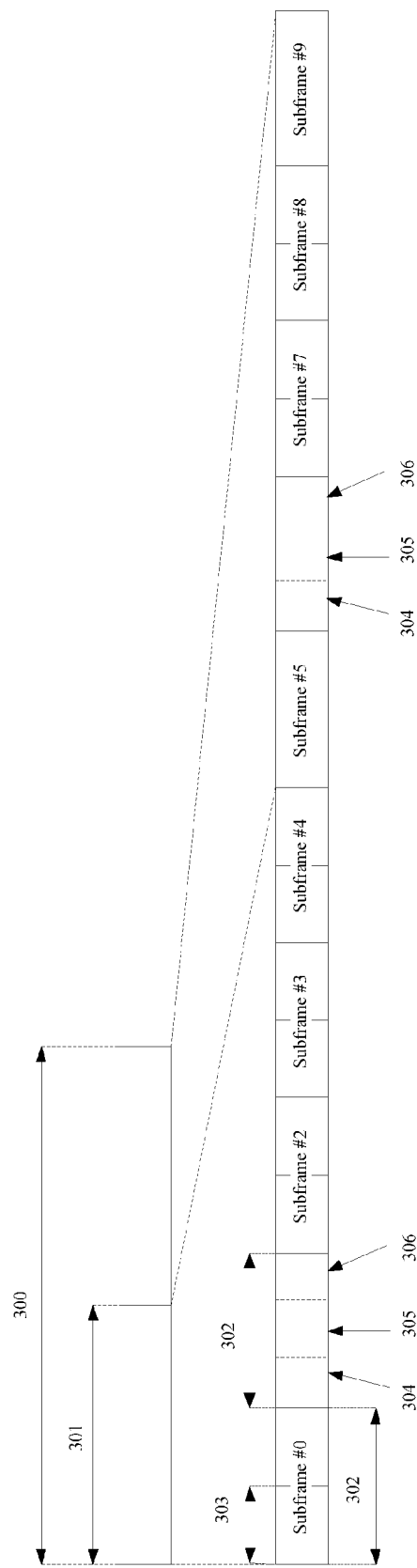
FIG. 3 illustrates a Time Division Duplex (TDD) LTE frame in accordance with an exemplary embodiment.

FIG. 3 illustrates a TDD LTE frame in accordance with an exemplary embodiment. One radio frame 300 may have a window of ten milliseconds (ms), with a half of a frame 301 having a window of 5 ms. The frame may be divided into subframes 302 of 1 ms in length, which may be further divided into slots 303 with 0.5 ms in length. The subframes may include a downlink pilot time slot 304, a guard period 305, and an uplink pilot time slot 306. In the example of FIG. 3, the frame 300 is divided into ten subframes. Out of the ten subframes in a frame, the number of subframes dedicated to UL transmission can be configured.

Exemplary embodiments are directed to a metric for assigning the subframes as uplink and downlink subframes, while taking into account the number of UEs associated to a BS in UL and DL. For clarity purposes, the following terms are defined:

$N_{DL}$: Number of UEs associated with a BS for DL transmission $N_{UL}$: Number of UEs associated with a BS for UL reception $\alpha$: UL traffic load as a fraction of DL traffic load (this is introduced as typically UL traffic is lesser than DL traffic and needs less resources, hence $\alpha \le 1$)

$\rho$: Fraction of subframes in TDD-LTE used for UL transmission

The base station can calculate $\rho$ as a function of the above parameters. In general the base station can pre-compute $\rho$ and store $\rho$ in a memory unit. $\rho$ may be calculated as:

$$\rho = \frac{\alpha N_{UL}}{\alpha N_{UL} + N_{DL}} \quad (3)$$

A simplified metric that takes into account only the number of UEs associated is given by:

$$\rho_S = \frac{N_{UL}}{N_{UL} + N_{DL}} \quad (4)$$

which may be used by the base station if the accuracy of the traffic load estimate is inadequate.

The base station can maintain a table in the memory which gives values of $\rho$ for different values of the other parameters. An example of such a table can be provided based on simulations done in traffic and wireless environments that are relevant to LTE systems with macro and Remote Radio Head (RRH) cells. The simulation parameters are noted in Table 1. In the exemplary simulation depicted in Table 1, the propagation environment between a macro cell and UE are assumed to be "International Telecommunication Union—Urban Macrocell" (ITU-UMa), and that between RRH and UE is assumed to be "ITU Urban Microcell" (ITU-UMi), such as a Low Power Node (LPN).

There are two kinds of UE distributions considered in the exemplary scenario. In the first exemplary configuration, the UEs are uniformly distributed over the entire macrocellular area and tend to be dropped uniformly across the entire area. The second exemplary configuration is a clustered UE distribution, with the UEs near the RRHs. In this configuration, the UEs tend to be dropped non-uniformly across the entire area. The second exemplary configuration models traffic hotspots such as lots of users in a wireless cafe accessing the wireless network.

TABLE 1

Simulation Parameters

| Parameter | Values used for evaluation |
|---|---|
| Performance metrics | Full buffer traffic: Cell capacity, Cell-edge user throughput |
| Deployment scenarios | Heterogeneous network with low power RRHs within the macrocell coverage transmission/reception points created by the RRHs have |

TABLE 1-continued

Simulation Parameters

| Parameter | Values used for evaluation |
|---|---|
| | different cell IDs as the macro cell |
| | Coordination area includes: |
| |    1 cell with N low-power nodes as starting point |
| |    3 intra-site cells with 3*N low-power nodes |
| Simulation case | ITU UMa for Macro, UMi for low power node |
| | UMa |
| |    UE speed: 3 km/hr |
| |    No outdoor in-car penetration loss |
| | UMi |
| |    Carrier Frequency: 2 GHz |
| |    100% UE dropped outdoors |
| |    No outdoor to indoor penetration loss |
| | Antenna Height: Applied for ITU UMa (Macro), ITU UMi (LPN) |
| |    10 m for RRH/Hotzone Node |
| |    25 m for Macro Node |
| |    3D antenna tilt for calibration (for 25 m): 12 degrees |
| | UE noise figure: Applicable to all the channel models |
| |    9 dB |
| | Minimum Distance: Applicable to all the channel models |
| |    Macro-RRH/Hotzone: >75 m |
| |    Macro-UE: >35 m |
| |    RRH/Hotzone-RRH/Hotzone: >40 m |
| |    RRH/Hotzone-UE: >10 m |
| | Modeling Conventions |
| |    Distance measure |
| |       1. Distance d is measured in 2 dimensions |
| |          Applies to both path loss formula, as well as |
| |    minimum Node/UE distances |
| Number of low power nodes per macro-cell | First Exemplary Configuration: N low power nodes per macro cell where the users are distributed uniformly in the macrocell area |
| | Second Exemplary Configuration: N low power nodes per macro cell where the users are distributed in a clustered manner around the RRHs |
| | Baseline: N = 4 |
| High power RRH Tx power (Ptotal) | 46/49 dBm in a 10/20 MHz carrier |
| Low power node TX power (Ptotal) | 30 dBm and 37 dBm for both FDD and TDD in 10 MHz carrier, with higher priority for 30 dBm |
| Number of UEs per cell | 25 for the First Exemplary Configuration and 60 for the Second Exemplary Configuration |
| System bandwidth | 10 MHz |
| Antenna pattern | For macro eNB and high-power RRH: |
| | 3D as baseline and 2D as additional |
| | Follow Annex A 2.1.1.1 Table A.2.1.1-2 in TR36.814 |
| | For low-power node: |
| | 2D as baseline and 3D as optional |
| | Horizontal plane: omnidirectional |
| | Vertical plane: |
| | $$A_V(\theta) = -\min\left[12\left(\frac{\theta - \theta_{etilt}}{\theta_{3db}}\right)^2, SLA_v\right]$$ |
| | $\theta_{3dB}$ = 40 degrees, $SLA_v$ = 20 dB |
| eNB Antenna tilt | For macro eNB and high-power RRH: Different downtilt values may be evaluated. |
| | For low-power node: 0 or 10 degrees |
| Antenna gain + connector loss | For macro eNB and high-power RRH: 17 dBi in ITU, For low power node: 5 dBi |

Figure 4:
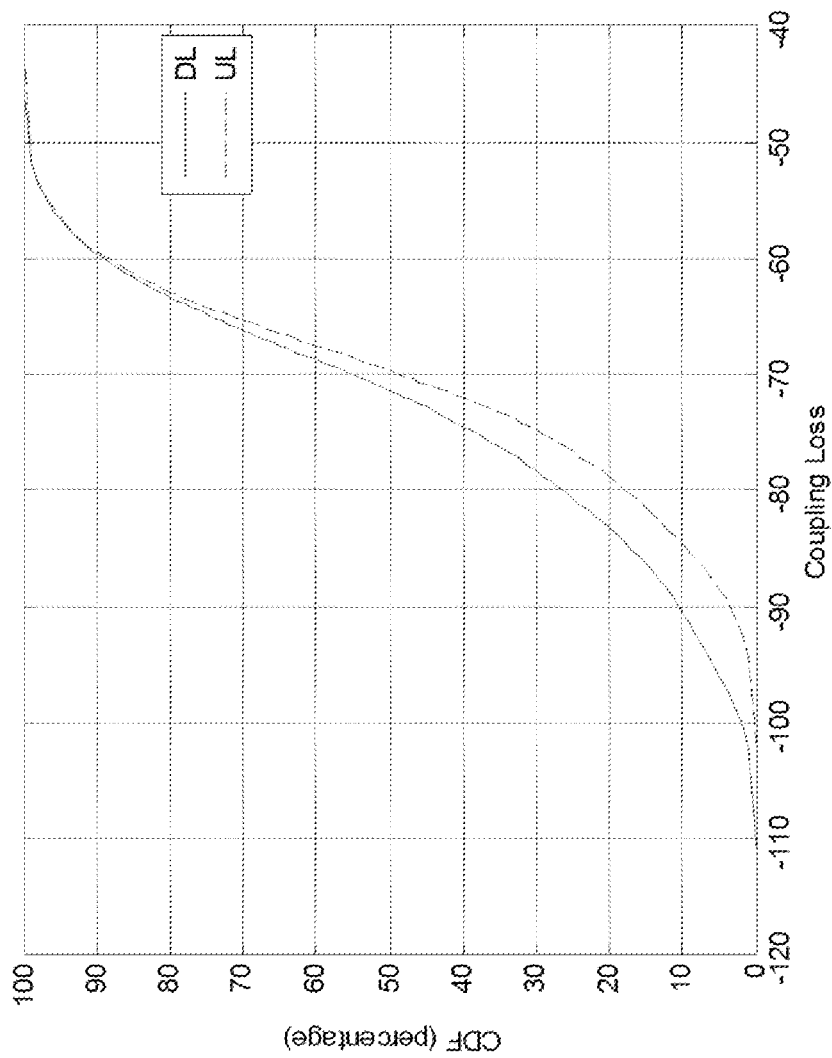
FIG. 4 illustrates a cumulative distribution function (CDF) plot for the coupling loss of the first exemplary configuration of Table 1.
Figure 5:
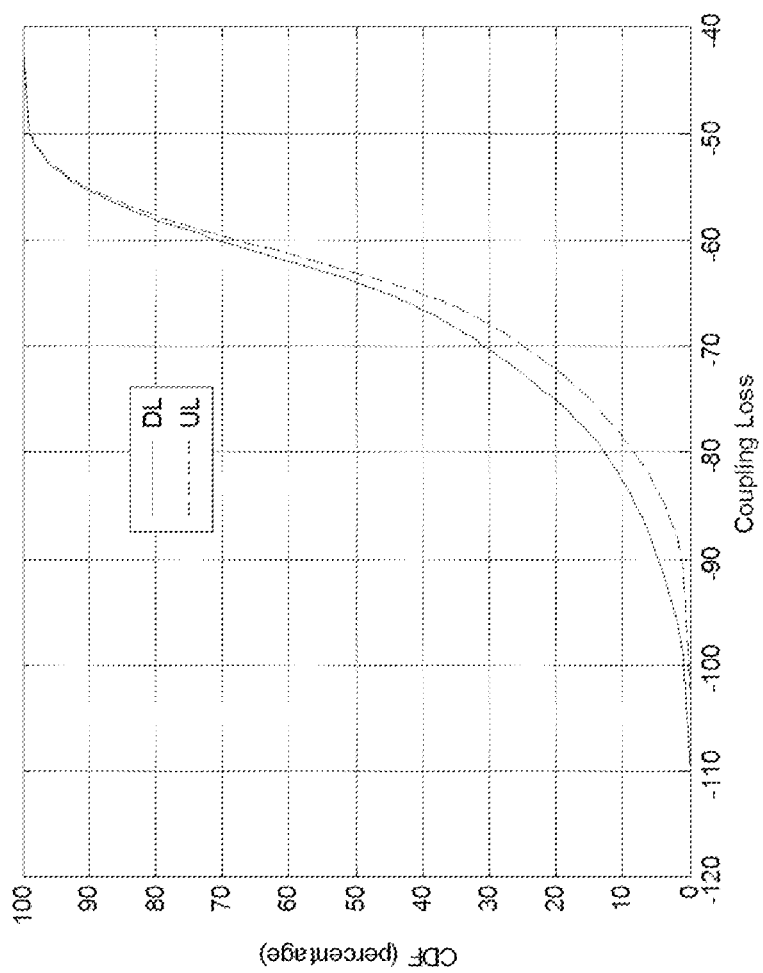
FIG. 5 illustrates a cumulative distribution function (CDF) plot for the coupling loss of the second exemplary configuration of Table 1.

FIG. 4 illustrates a cumulative distribution function (CDF) plot for coupling loss, or link gain between the transmitter and receiver, for the first exemplary configuration (i.e. uniform distribution) of Table 1. FIG. 5 illustrates a cumulative distribution function (CDF) plot for coupling loss, or link gain between the transmitter and receiver, for the second exemplary configuration (i.e. clustered distribution) of Table 1.

To give an example, how the separate associations affect the metrics $\rho$ and $\rho_s$ the CDF of link gains are plotted as defined in equation (1), for all the UEs in UL and DL. The results are shown in FIGS. 4 and 5 for the first and second exemplary configurations, respectively. As the curves lie more to the right, for a given percentage of UEs in the y-axis, the link gain values are higher for UL. For DL, the link gain to the associated macro BS can be low as the link gain can be compensated for by the high transmit power of the macro. FIGS. 4 and 5 show the measured gap between UL and DL for the propagation environments that are specified in Table 1.

TABLE 2

Ratio of UL subframes to total subframes for different
UE configurations and transmit nodes (macro or RRH)

|  | $\rho_s$ | $\rho$ ($\alpha = 0.8$) | $\rho$ ($\alpha = 0.6$) | $\rho$ ($\alpha = 0.4$) | $\rho$ ($\alpha = 0.2$) |
| --- | --- | --- | --- | --- | --- |
| First Exemplary Configuration: Macro | 0.2702 | 0.2285 | 0.1817 | 0.1290 | 0.0689 |
| First Exemplary Configuration: RRH | 0.6053 | 0.5510 | 0.4792 | 0.3802 | 0.2347 |
| Second Exemplary Configuration: Macro | 0.2312 | 0.1940 | 0.1529 | 0.1074 | 0.0567 |
| Second Exemplary Configuration: RRH | 0.5630 | 0.5076 | 0.4360 | 0.3401 | 0.2049 |

In Table 2, the metrics $\rho$ and $\rho_s$ for different UL traffic loads are stored. Such a table can be saved in the memory module of the base station. For the first exemplary configuration, more UEs are associated to the macro than RRH in DL because of the high transmit power of the macro. In UL, some UEs are now associated with the RRH, as metrics $\rho$ and $\rho_s$ are higher for the RRH than the macro. In the second exemplary configuration, more UEs are already associated with the RRH, even for DL because of the clustering of UEs around RRH. Hence, the metrics have lower values. The values given in Table 2 may serve as design parameters for splitting subframes for UL and DL traffic in LTE.

Figure 6:
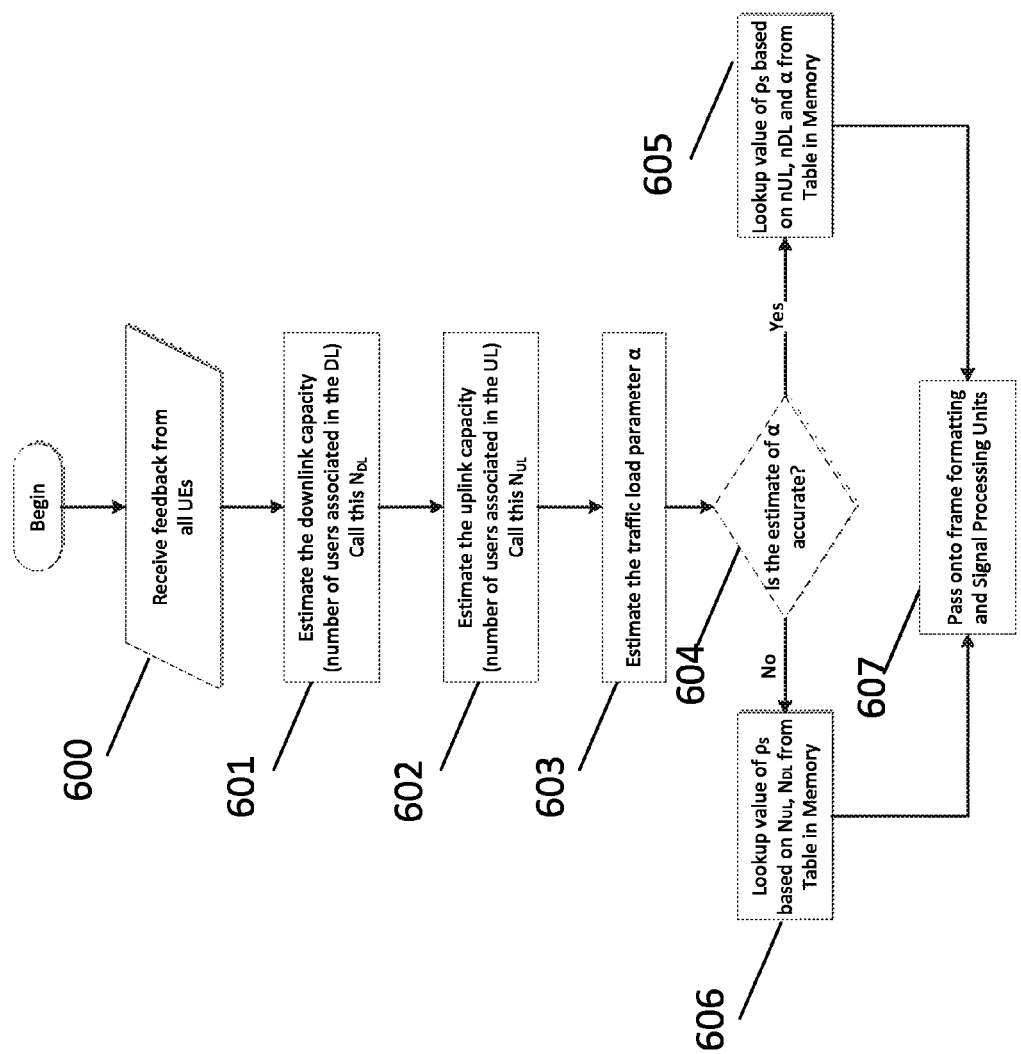
FIG. 6 illustrates an flowchart of operations for determining a UL subframe allocation ratio, in accordance with an exemplary embodiment.

FIG. 6 illustrates an flowchart of an algorithm for determining a UL subframe allocation ratio, in accordance with an exemplary embodiment. At 600, the base station receives feedback from all of the UEs associated with the base station, which can be conducted by an Rx Module. At 601, the base station estimates the downlink capacity from the feedback, which can be conducted by a Subframe Module. At 602, the base station estimates the uplink capacity from the feedback, which can be conducted by a Subframe Module. At 603, the base station estimates a traffic load parameter, such as the ratio of uplink traffic load to downlink traffic load, which can be conducted by a Subframe Module. At 604, the base station determines if the estimation of the traffic load is accurate, which can be conducted by a Subframe Module. If the estimation of the traffic load is not accurate, then the base station proceeds to step 606 to utilize the simplified metric that doesn't involve the traffic load. If the estimation of traffic load is reliable, then the base station proceeds to 605 and utilizes the traffic load in the metric calculation. At 607, the base station passes the results of the calculation to appropriate frame formatting and signal processing modules to adjust the subframes. The corresponding computational modules of the base station that implements FIG. 6 is given in FIG. 7.

Figure 7:
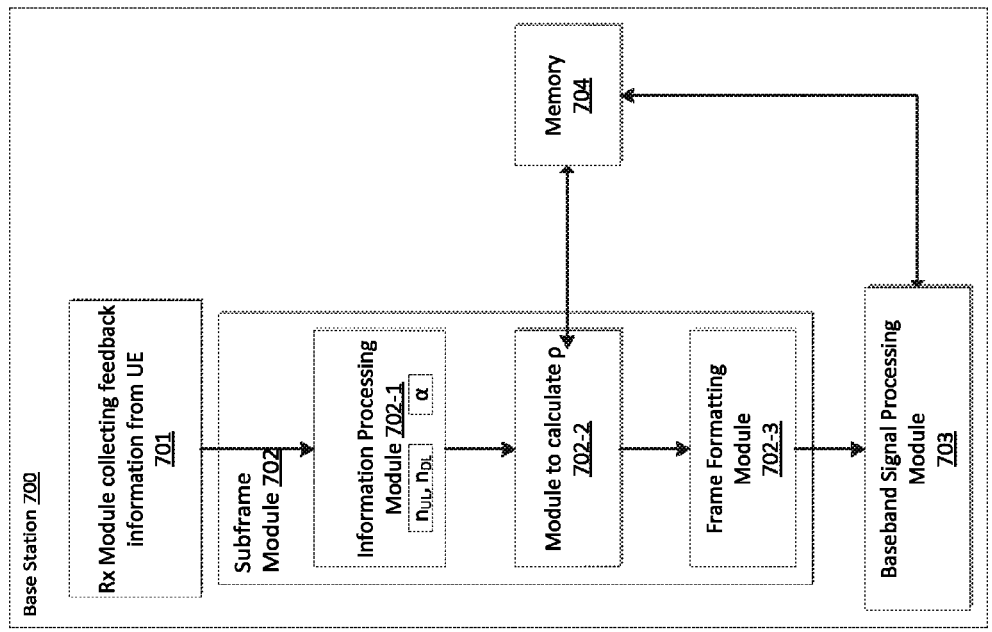
FIG. 7 illustrates a base station configuration in accordance with an exemplary embodiment.

FIG. 7 illustrates a base station 700 configuration in accordance with an exemplary embodiment. The Rx module 701 receives feedback from UEs. The Subframe module 702 in FIG. 7 then performs parameter estimation and $\rho$ calculation. The information processing submodule 702-1 estimates $N_{DL}$, $N_{UL}$ and $\alpha$. The $\rho$ calculation submodule 702-2 utilizes the flowchart as depicted in FIG. 6. The tables that store $\rho$ as a function of the parameters $N_{DL}$, $N_{UL}$ and $\alpha$ (example shown in Table 2) are stored in the base station memory module 704 and is used by the $\rho$ calculation submodule 702-2 in FIG. 6. The frame formatting module 702-3 formats adjusts the number of subframes based on the calculation. The Baseband Signal Processing Module 703 processes the results of the frame formatting for signal processing.

The submodule 701-2 calculating $\rho$ may decide if parameter $\alpha$ is estimated accurately. If $\alpha$ is not estimated accurately, then $\alpha$ should not be utilized in the calculation of $\rho$. The decision to utilize a simplified metric without $\alpha$ can be made based on factors such as the accuracy of received UE measurements, UE velocity, applications that determine how fast $\alpha$ changes, channel estimation errors and delay considerations.

Figure 8:
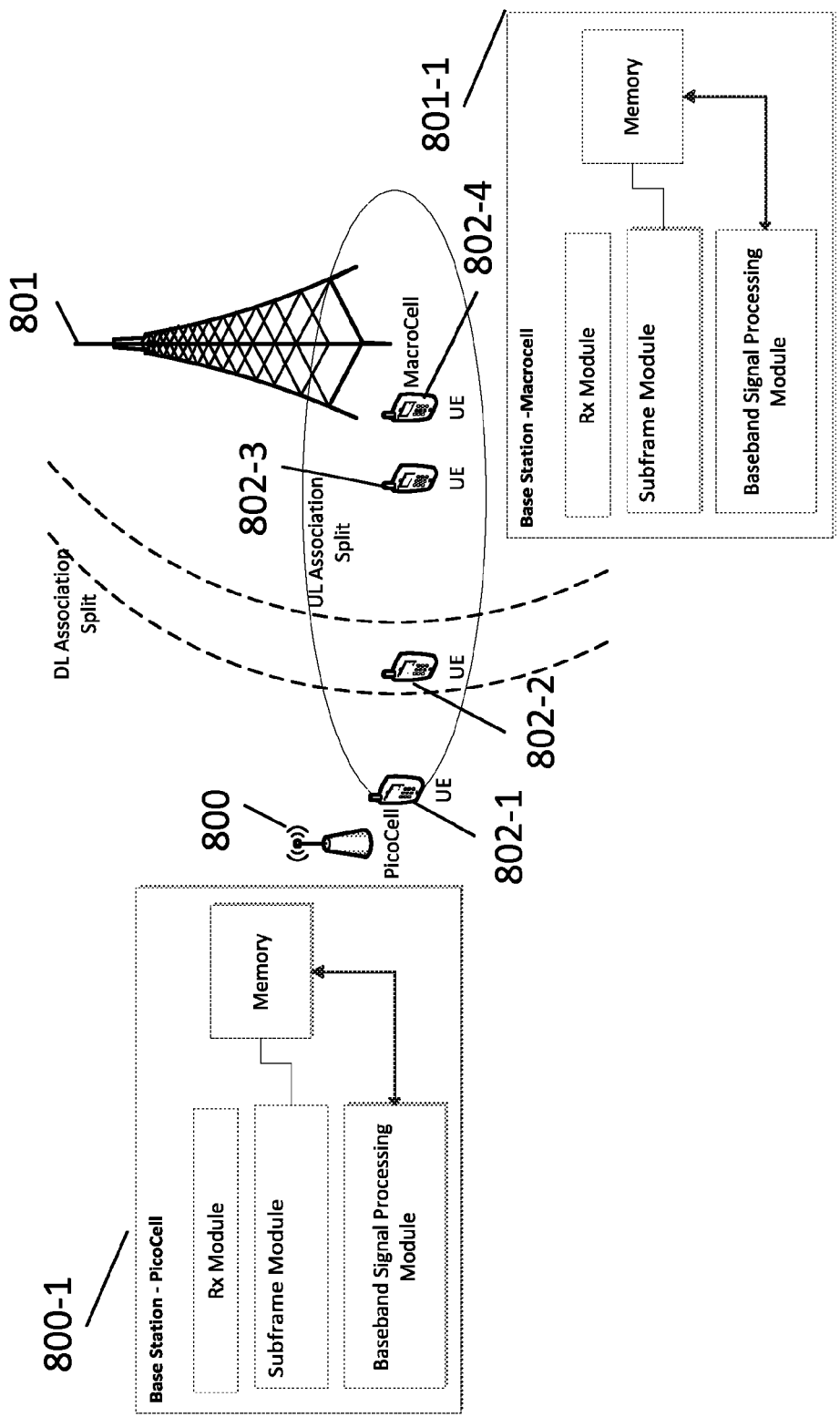
FIG. 8 illustrates a scenario in accordance with an exemplary embodiment.

FIG. 8 illustrates a scenario in accordance with an exemplary embodiment. The exemplary scenario of FIG. 8 involves two base stations—macro 801 and pico 800, with configurations 800-1, 801-1 from FIG. 7, with four UEs 802-1, 802-2, 802-3, 802-4. There is a separate association of UEs in UL and DL. UE 802-1 is associated to the pico 800 in DL and UE 802-1 and UE 802-2 are associated to the pico 800 in UL. Similarly the macro 801 serves UEs 802-2, 802-3, 802-4 in DL but only UEs 802-3 and 802-4 in the UL. The BSs serve different number of UEs in UL and DL The pico 800 serves two UEs for UL and one UE for DL. The macro 801 serves two UEs for UL and 3 UEs for DL. The subframes are divided accordingly. For the pico, the ratio $\rho_s=2/(1+2)=2/3$ and for the macro, it is $\rho_s=2/(3+2)=2/5$.

FIGS. 9(a) and 9(b) illustrate an example division of subframes for the macro and pico that results from the subframe adjustments from FIG. 8. FIG. 9(a) illustrates the pico having a division of six UL subframes and four DL subframes resulting from the determined ratio $\rho_s$ of 2/3 for the pico. FIG. 9(b) illustrates a division of four UL subframes and six DL subframes resulting from the determined ratio $\rho_s$ of 2/5 for the macro.

Figure 10:
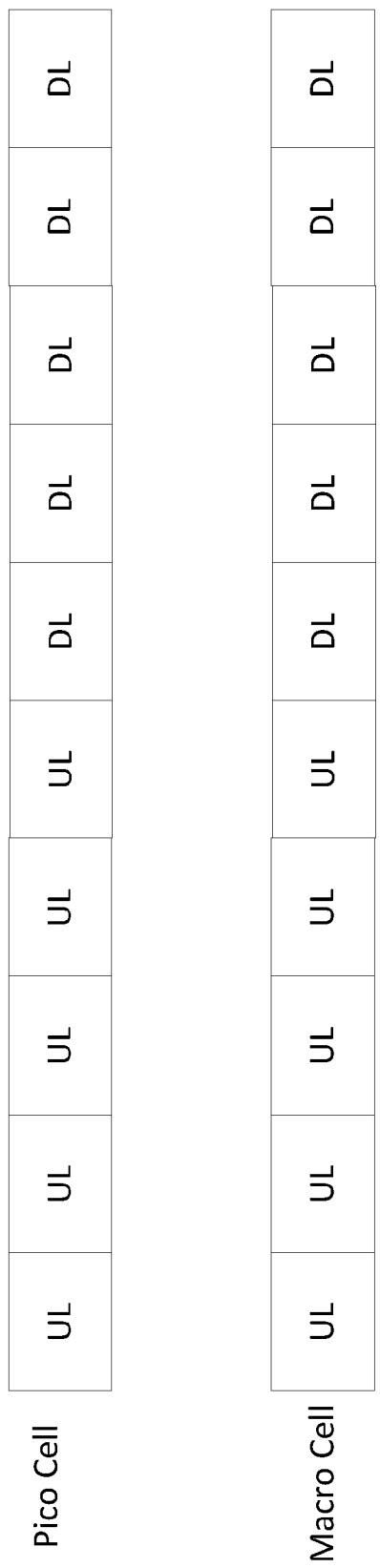
FIG. 10 illustrates an exemplary separate split, in accordance with exemplary embodiments.

FIG. 10 illustrates a separate split, in accordance with exemplary embodiments. A separate split could arise when traffic load factors $\alpha$ are also taken into account. The subframe split depicted in FIG. 10 also arises when association is only based on DL characteristics as in the related art base stations. However, in contrast to related art base systems, the subframe split leading to FIG. 10 now takes into account different number of associated UEs in uplink and downlink.

Figure 11:
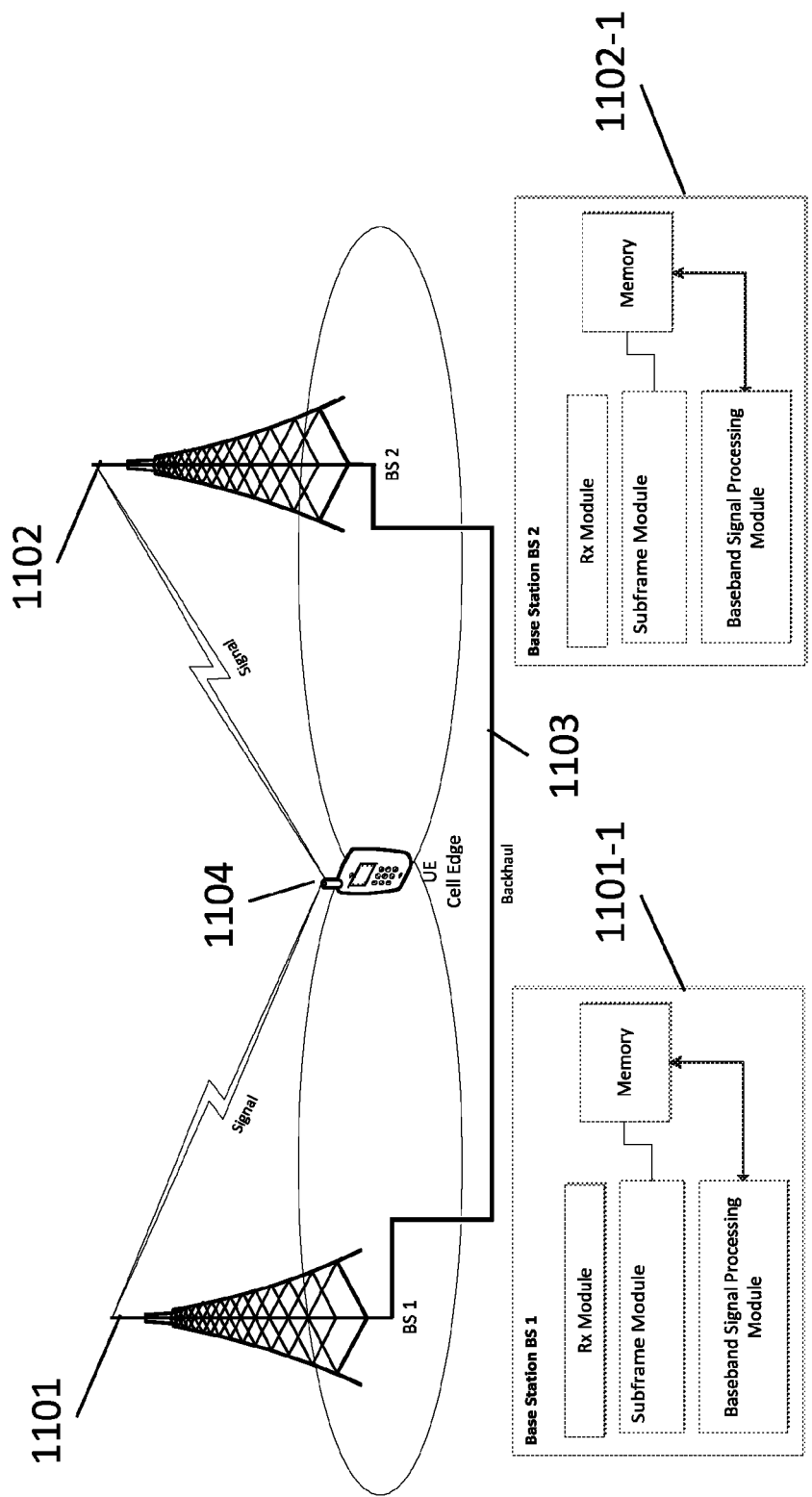
FIG. 11 illustrates an implementation with Coordinated Multipoint Transmission Receiption (CoMP), in accordance with exemplary embodiments.

FIG. 11 illustrates an implementation with Coordinated Multipoint Transmission Receiption (CoMP), in accordance with exemplary embodiments. With signal processing capabilities at the base station and also faster and with more intelligent backhaul systems, base stations may be able to cooperate to increase the transmission efficiency to the UEs. By utilizing Coordinated Multipoint Transmission Reception (CoMP). In CoMP adjacent base stations 1101, 1102 (macro or pico) are connected via a backhaul 1103 and can communicate amongst each other to reach a UE 1104 that is located at the cell edge. Each BS 1101 1102 may utilize system configurations 1101-1, 1102-1 such as those depicted in FIG. 7 in conjunction with the backhaul connection 1103 to coordinate communications with a UE 1104 located at a cell edge. This backhaul connection permit the base stations to communicate information to each other, such as $\rho_s$, $\alpha$.

Portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the exemplary embodiments, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The exemplary embodiments also relate to an apparatus for performing the operations herein. This apparatus may be specially constructed for the required purposes, or it may include one or more general-purpose computers selectively activated or reconfigured by one or more computer programs. Such computer programs may be stored in a non-transitory computer readable medium or a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus.

Various general-purpose systems may be used with programs and modules in accordance with the teachings herein, or it may prove convenient to construct a more specialized apparatus to perform desired method steps. In addition, the exemplary embodiments are not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the exemplary embodiments may be implemented using circuits and logic devices (hardware), while other aspects may be implemented using instructions stored on a machine-readable medium (software), which if executed by a processor, would cause the processor to perform a method to carry out the exemplary embodiments. Furthermore, some exemplary embodiments may be performed solely in hardware, whereas other exemplary embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the exemplary embodiments will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A base station, comprising:
    an information processing module that determines a number of uplink user equipments (UEs) handled by the base station, and a number of downlink UEs handled by the base station;
    a calculation module that determines a metric calculation based on the determined number of uplink UEs and the determined number of downlink UEs; and
    a frame formatting module that adjusts a number of subframes within a frame based on the determined metric calculation.

2. The base station of claim 1, wherein the calculation module determines the metric calculation based on a ratio of an uplink traffic load to a downlink traffic load.

3. The base station of claim 1, wherein the calculation module determines the metric calculation based on a ratio of the determined number of uplink UEs to a combination of the determined number of uplink UEs and the determined number of downlink UEs when a simplified metric is utilized.

4. The base station of claim 1, wherein the calculation module determines the metric calculation based on a ratio of the determined number of uplink UEs weighted by a ratio of an uplink traffic load to a downlink traffic load, to a combination of the weighted determined number of uplink UEs and the determined number of downlink UEs when a simplified metric is not utilized.

5. The base station of claim 1, wherein the calculation module determines when a simplified metric is utilized based on rate of change of a ratio of an uplink traffic load to a downlink traffic load.

6. The base station of claim 1, wherein the calculation module determines when a simplified metric is utilized based on an accuracy of received UE measurements.

7. A method of operating a base station, comprising:
    determining a number of uplink user equipments (UEs) handled by the base station and a number of downlink UEs handled by the base station;
    determining a metric calculation based on the determined number of uplink UEs, and the determined number of downlink UEs; and
    adjusting a number of subframes within a frame based on the determined metric calculation.

8. The method of claim 7, wherein the determining the metric calculation is based on a ratio of an uplink traffic load to a downlink traffic load.

9. The method of claim 7, wherein the determining the metric calculation is based on a ratio of the determined number of uplink UEs to a combination of the determined number of uplink UEs and the determined number of downlink UEs when a simplified metric is utilized.

10. The method of claim 7, wherein the determining the metric calculation is based on a ratio of the determined number of uplink UEs weighted by a ratio of an uplink traffic load to a downlink traffic load, to a combination of the weighted determined number of uplink UEs and the determined number of downlink UEs when a simplified metric is not utilized.

11. The method of claim 7, further comprising determining when a simplified metric is utilized based on rate of change of a ratio of an uplink traffic load to a downlink traffic load.

12. The method of claim 7, further comprising determining when a simplified metric is utilized based on an accuracy of received UE measurements.

13. A non-transitory computer readable medium, having stored therein a program for making a computer execute a method for operating a base station, the program including computer executable instructions for performing steps comprising:
    determining a number of uplink user equipments (UEs) handled by the base station and a number of downlink UEs handled by the base station;

determining a metric calculation based on the determined number of uplink UEs, and the determined number of downlink UEs; and adjusting a number of subframes within a frame based on the determined metric calculation.

14. The non-transitory computer readable medium of claim 13, wherein the determining the metric calculation is based on a ratio of an uplink traffic load to a downlink traffic load.

15. The non-transitory computer readable medium of claim 13, wherein the determining the metric calculation is based on a ratio of the determined number of uplink UEs to a combination of the determined number of uplink UEs and the determined number of downlink UEs when a simplified metric is utilized.

16. The non-transitory computer readable medium of claim 13, wherein the determining the metric calculation is based on a ratio of the determined number of uplink UEs weighted by a ratio of an uplink traffic load to a downlink traffic load, to a combination of the weighted determined number of uplink UEs and the determined number of downlink UEs when a simplified metric is not utilized.

17. The non-transitory computer readable medium of claim 13, wherein the instructions further comprise determining when a simplified metric is utilized based on rate of change of a ratio of an uplink traffic load to a downlink traffic load.

18. The non-transitory computer readable medium of claim 13, wherein the instructions further comprise determining when a simplified metric is utilized based on an accuracy of received UE measurements.

* * * * *